Figure 6:
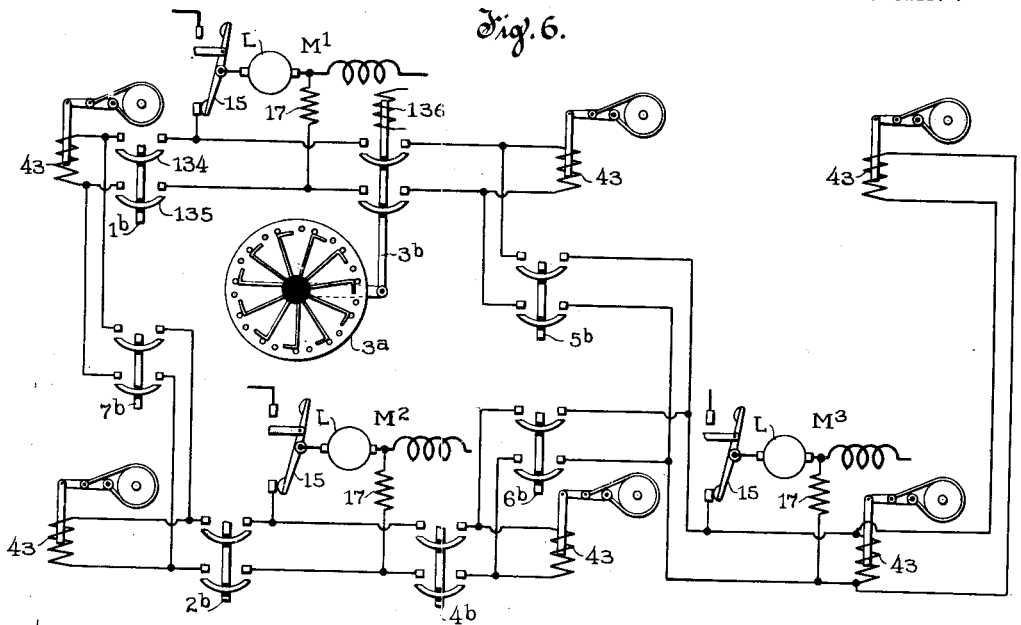

M. M. GOLDENSTEIN.
MOTOR CONTROLLER.
APPLICATION FILED FEB. 16, 1915.
1,176,542.
Patented Mar. 21, 1916.
5 SHEETS—SHEET 1.
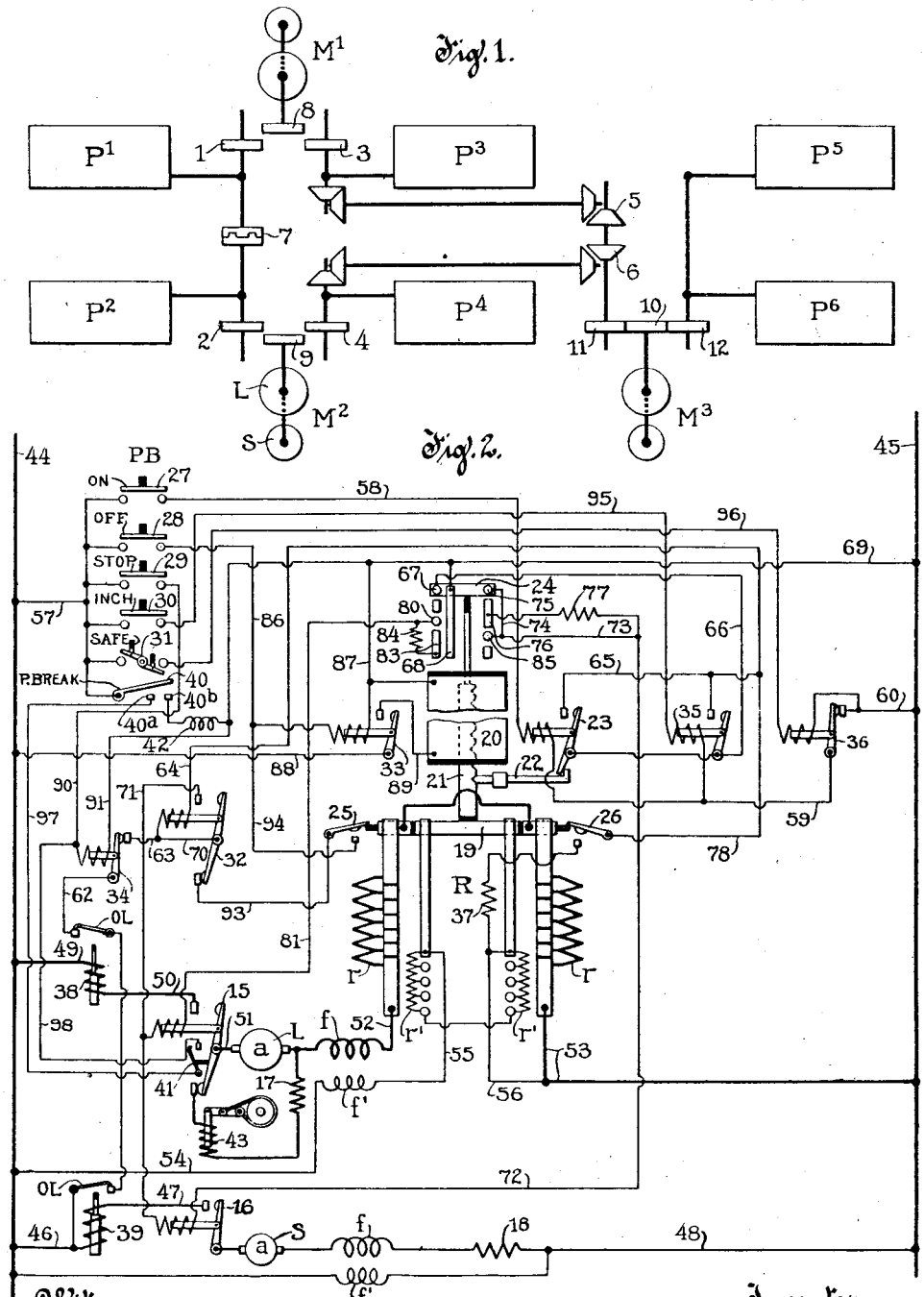

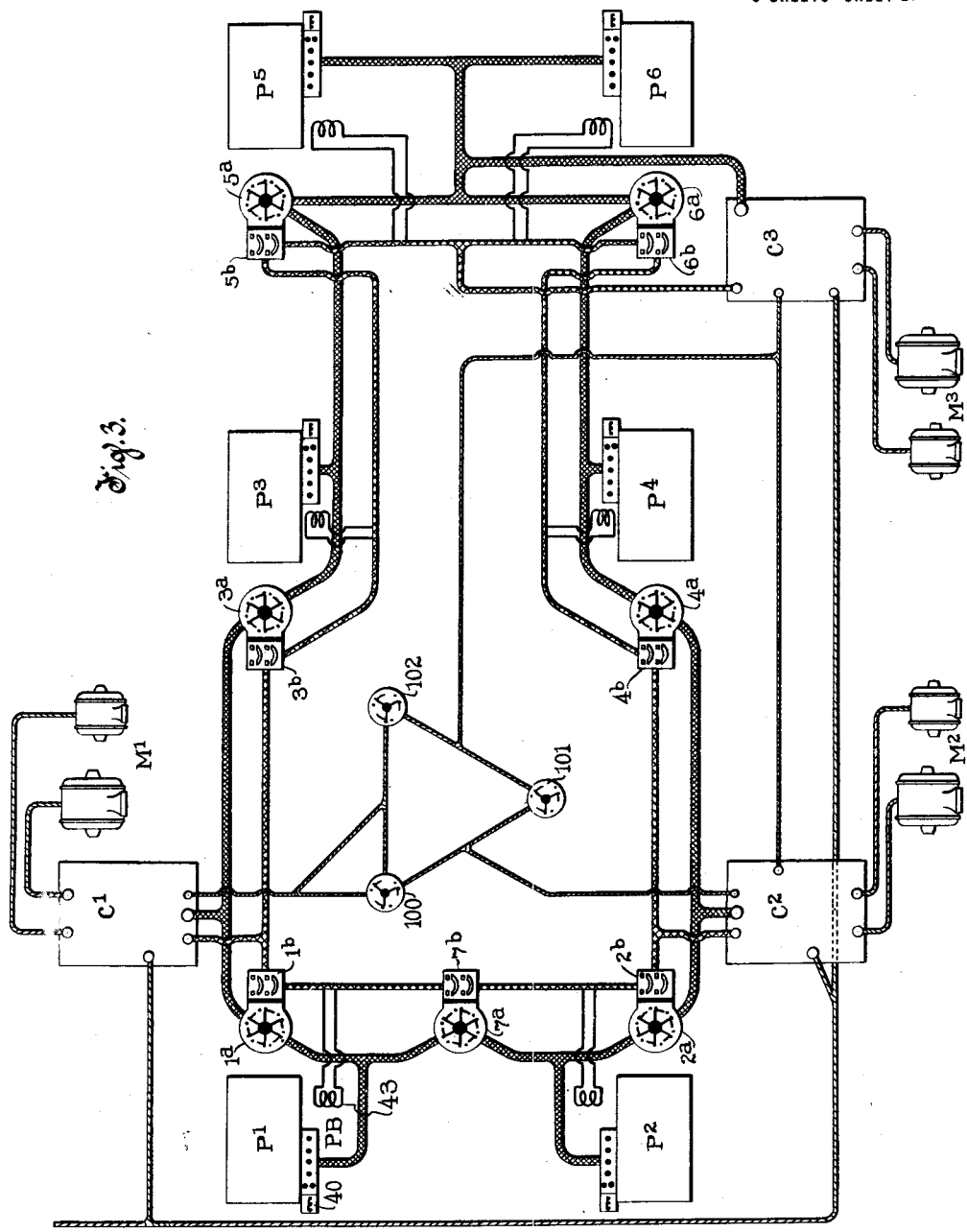

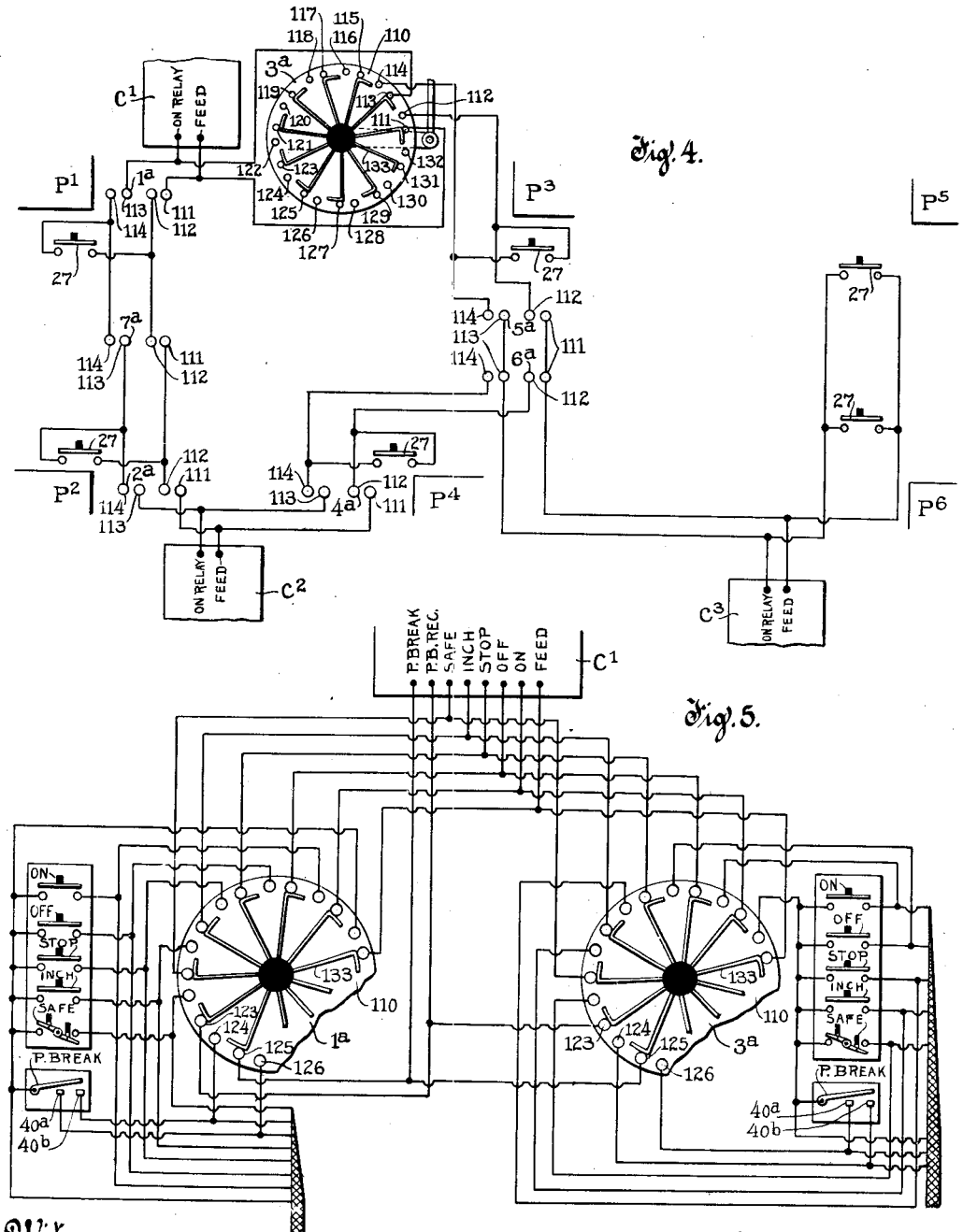

M. M. GOLDENSTEIN.
MOTOR CONTROLLER.
APPLICATION FILED FEB. 16, 1915.

1,176,542.

Patented Mar. 21, 1916.
5 SHEETS—SHEET 4.

Witnesses
J. L. Johnson
G. A. Watson

Inventor
Maurice M. Goldenstein
By Frank H. Hubbard
Attorney

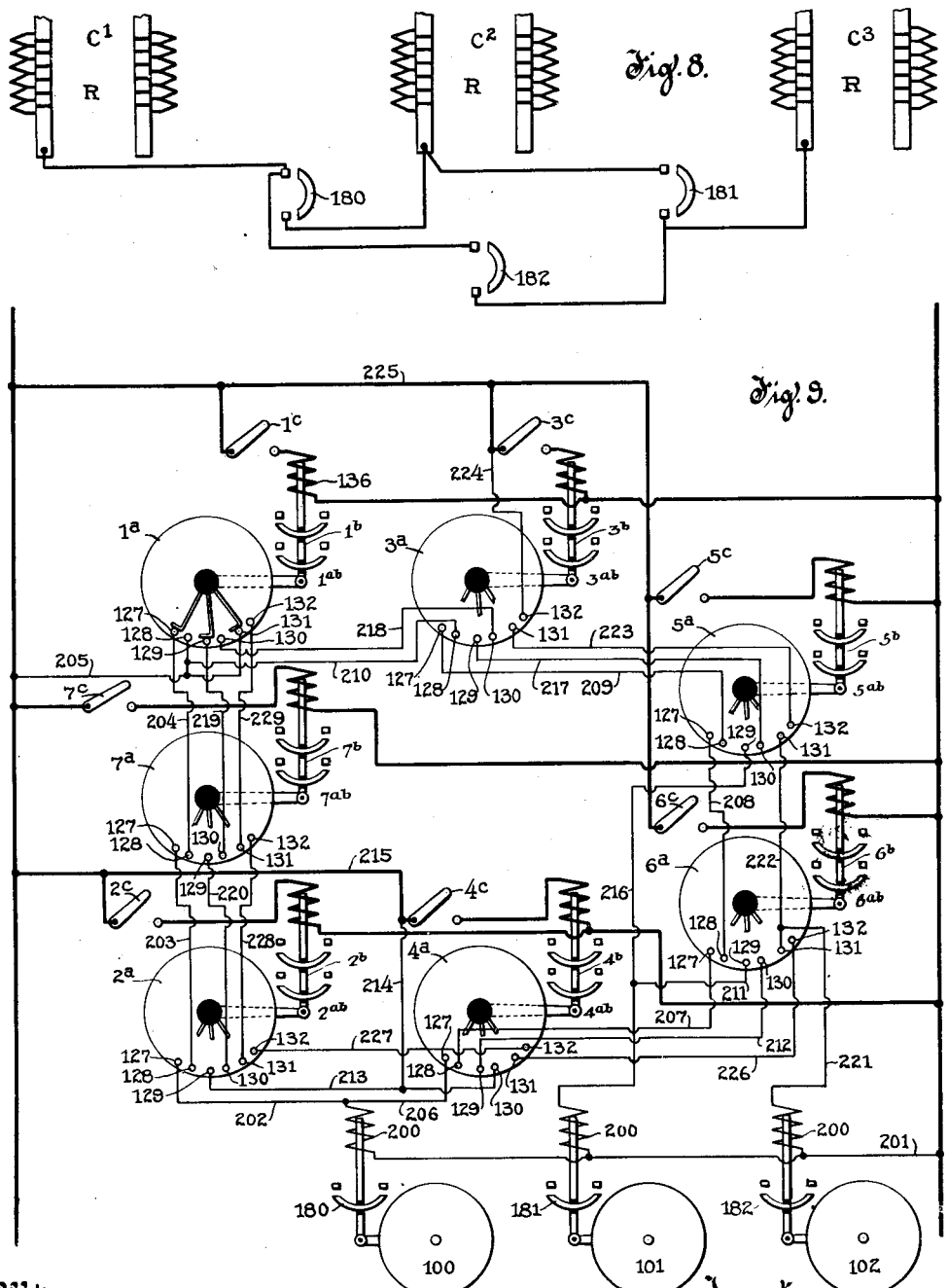

UNITED STATES PATENT OFFICE.

MAURICE M. GOLDENSTEIN, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROLLER.

1,176,542. Specification of Letters Patent. Patented Mar. 21, 1916.

Application filed February 16, 1915. Serial No. 8,627.

*To all whom it may concern:*

Be it known that I, MAURICE M. GOLDENSTEIN, a citizen of the United States, residing at Milwaukee, in the county of Milwaukee and State of Wisconsin, have invented new and useful Improvements in Motor-Controllers, of which the following is a full, clear, concise, and exact description, reference being had to the accompanying drawing, forming a part of this specification.

This invention relates to controllers for multiple unit printing presses and other mechanisms employing one or more motor drives and variable driving connections for shifting a driven unit from one drive to another or to combinations thereof or for shifting the drives from one driven unit to another or to combinations thereof or for effecting different combinations of the driven units and drives.

Considering for example a multiple unit press, such as is commonly employed for newspaper work, a wide range of flexibility in drive and control is highly desirable to meet the different conditions presented and to avoid delay in the event of breakdowns. For instance, in the case of a press having six units, each comprising a deck or one or two couplets, and provided with three driving equipments, it is sometimes desirable to drive the units in pairs, each pair from one of the three drives. On the other hand, should one of the drives become disabled it might be necessary to connect the six units to the remaining two drives either in sets of three or four and two or in some other combination. Again, for certain work it might be desired to drive a plurality of press units from two or more of the drives jointly. Of course, the driving variations and combinations required would vary with the work to be done and the different conditions met with in different plants, and in some instances a much wider range of flexibility than that above discussed would be required. Any flexibility of drive requires a corresponding degree of flexibility of control and it will at once be apparent to those familiar with printing press controllers that flexibility of control to meet conditions such as those above discussed presents many more difficulties than flexibility of drive.

This invention has among its objects to provide commutatable control means which may be readily adapted to a wide range of drive commutation.

A further object of the invention is to provide commutable control means whereby a wide range of flexibility of control may be obtained with a relatively small number of commutating instrumentalities.

A still further object is to provide control commutating means adaptable to different types of controllers and to mechanisms varying in the number of driving and driven units and which may be associated with the drive commutating means to effect control commutations incidentally to and corresponding with the drive commutations.

Numerous other objects and advantages of the invention will hereinafter appear.

The accompanying drawings illustrate one embodiment of the invention and the same will now be described, it being understood that the invention is not limited to the specific embodiment thereof selected for the purpose of illustration except in so far as certain claims may be specifically directed thereto.

Figure 7:
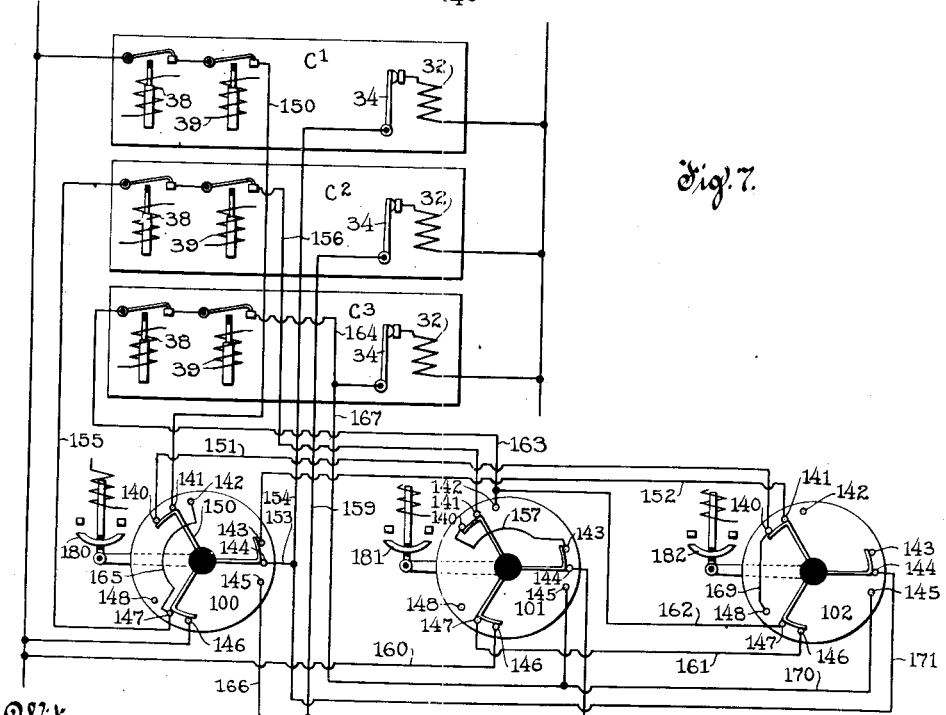

In the accompanying drawings, Figure 1 is a schematic view of a multiple unit press and a plurality of motor driving sets therefor; Fig. 2 is a diagrammatic view of a controller proposed for each of the motor driving sets. Fig. 3 is a schematic and diagrammatic view of the press units, the motor driving sets, the control panels for the latter, the control stations and brake coils of the press units, the switches for effecting variations in control according to the variations in drive and in general the electrical interconnections of the various control parts; Figs. 4 and 5 are diagrammatic views showing in detail the wiring for the push-button stations and paper break switches of the several press units; Fig. 6 is a diagrammatic view showing in detail the wiring for electrical brake mechanisms associated with the various press units; Fig. 7 is a diagrammatic view showing in detail the wiring arrangement for the overload switches of the several motor drives and the means for interconnecting said overload switches; Fig. 8 is a diagrammatic view showing equalizing connections for the several motor drives and switches for establishing these connections; and, Fig. 9 is a schematic and diagrammatic view of the several switches for effecting control commutation and of the control circuits of these switches.

Referring to Fig. 1 the same shows schematically six presses or press units P', P², P³, P⁴, P⁵ and P⁶ provided with three double motor drive sets M', M² and M³. Each drive set includes a large motor L and a small motor S, the latter being provided for starting, inching and slow speed purposes, as is well understood. Fig. 1 also shows schematically driving connections between the motor sets and press units including seven coupling mechanisms, 1 to 7 inclusive, whereby the press units may be coupled to the motor driving sets for operation individually or in various combinations. It should, however, be understood that the number and location of couplings may in practice be varied according to the particular requirements to be satisfied. As illustrated, the couplings 1 and 3 comprise slip gears to be thrown into and out of mesh with a pinion 8 driven by the motor set M' while the couplings 2 and 4 comprise similar slip gears to be thrown into and out of mesh with a pinion 9 driven by the motor set M². The couplings 5 and 6 are also shown in the form of slip gears the same constituting members of beveled gear sets. The coupling 7 on the other hand is shown as of the clutch type and interposed between press units P' and P². The motor set M³ drives a pinion 10 meshing with a pinion 11 driving into the bevel slip gear sets 5 and 6 and also meshing with a pinion 12 permanently coupled with the press units P⁵ and P⁶. Press unit P' is connected between the slip gear 1 and clutch 7, press unit P² between clutch 7 and slip gear 2, press unit P³ between slip gears 3 and 5 and press unit P⁴ between slip gears 4 and 6.

With the foregoing description of the driving connections, which are illustrated in a conventional manner, the flexibility of drive will be readily apparent. For example, by throwing slip gears 1 and 3 into mesh with the driving pinion 8 and the slip gears 2 and 4 into mesh with the driving pinion 9, all other couplings being open, then the motor set M' will drive the press units P' and P³ while the motor set M² will drive the press units P² and P⁴ and the motor set M³ will drive the press units P⁵ and P⁶. Under these conditions also it will be noted that the pairs of press units just mentioned may all be operated at the same time or each pair may be operated without regard to the operation of the remaining pairs. Again assuming that slip gears 1 and 3 be thrown into mesh with driving pinion 8 and that press units P' and P² be coupled by clutch 7 then the three press sections P', P² and P³ will be jointly operated by a single motor set, namely M'. At the same time connection might be established through slip gear 6 whereby the three remaining press units could be jointly driven by the motor set M³, thus providing for operation of all press sections should, for instance, the motor set M² become disabled. Other possible combinations are set forth in the following table which will be readily understood from the foregoing description, it being noted from the grouping of the combinations that all units are always available for use:

| Press units. | Motor set. | Connections. |
| --- | --- | --- |
| P', P², and P⁴ | By M² | Through 7, 2 and 4. |
| P³, P⁵, and P⁶ | By M³ | Through 5. |
| P', P², P³, P⁴ | By M', M² | Through 1, 7, 2, and 4. |
| P⁵, P⁶ | By M³ | Direct. |
| P³, P⁴, P⁵, P⁶ | By M³ | Through 5 and 6. |
| P', P² | By M' | Through 1 and 7. |
| P', P² | By M² | Through 2 and 7. |
| P', P², P³, P⁴ | By M' (M² disabled) | Through 1, 2, 3, 4 and 7. |
| P', P², P³, P⁴ | By M² (M' disabled) | Through 1, 2, 3, 4 and 7. |
| P⁵, P⁶ | By M³ | Direct. |
| P³, P⁴, P⁵, P⁶ | By M', M³ | Through 3, 5 and 6. |
| P', P² | By M² | Through 2 and 7. |
| P³, P⁴, P⁵, P⁶ | By M², M³ | Through 4, 5 and 6. |
| P', P² | By M' | Through 1 and 7. |
| P', P², P³, P⁴, P⁵, P⁶ | By M', M², M³ | Through 1, 2, 3, 4, 5, 6, 7. |

It will, of course, be apparent that the foregoing table does not recite all possible variations in the driving connections. Further, it will be readily apparent that the variations above set forth require material variations in the control of the motor sets.

Fig. 2 illustrates diagrammatically a conventional form of controller for each of the three motor sets of Fig. 1, it being understood that certain circuit alterations hereinafter noted will be required for commutating purposes. In this view the two motors L and S of one motor set are diagrammatically illustrated as of the compound type, each being provided with an armature $a$, a series field winding $f$ and a shunt field winding $f'$. The motors L and S are provided with magnetic main switches 15 and 16 respectively and the switch 15 when in normal position completes through its "down" contacts a dynamic braking circuit for motor L through a resistance 17. The small motor S is adapted to be connected across the supply circuit through a resistance 18, either fixed or variable, while the large motor L is provided with a controlling rheostat R. The rheostat R is of a conventional form and includes a cross head 19 having insulated contact parts movable over coöperating contacts to control armature resistances $r$ and field resistances $r'$ for the motor L. The cross-head descends by gravity to gradually exclude the armature resistances $r$ and to thereafter gradually include the field resistances $r'$, while it is provided with an operating solenoid 20 for raising the same to progressively exclude the field resistances and include the armature resistances. The plunger 21 of the solenoid is notched to be engaged by a latching pawl 22 normally biased to latching position and adapted to be tripped by an electro-magnetic relay 23 upon response of the latter. Thus provision is made for operation of the rheostat cross-head in both directions for the desired speed regulation and for latching of the cross-head in the selected speed regulating position. The rheostat also has associated therewith an auxiliary contact member 24 movable with the cross-head 19 during initial movement of the latter to coöperate with contacts hereinafter specified for the control of pilot circuits including the circuits of the motor control switches 15 and 16. Still further, the cross-head has associated therewith an up limit switch 25 and a switch 26 opened thereby in its upper extreme position. These switches are both biased to closed position and function as hereinafter set forth.

The main switches and rheostat are controllable at will from a push-button station PB through the medium of a plurality of relays, said main switches as hereinafter set forth, being also governed to a certain extent by the auxiliary contacts of the rheostat. The pushbutton station includes an "on" switch 27, an "off" switch 28, a "stop" switch 29, an "inching" switch 30 and a "safe" switch 31. The switches 27 to 30 are all of the normally open type while the switch 31 is preferably of the snap switch type to be set in either open or closed position. The "on" switch 27 acts through the relay 23 above specified and a second electromagnetic relay 32 (hereinafter termed main relay) for starting and accelerating purposes. The "off" switch 28 acts through an electromagnetic relay 33 to energize the rheostat solenoid 20 to lift the cross-head for slow-down purposes. The "stop" switch 29 acts through an electromagnetic relay 34 to deënergize the relay 32, through the deënergization of said relay to deënergize either or both of the motor controlling switches 15 and 16. In this connection, also, it is to be noted that the main relay 32 when deënergized completes through "down" contacts an energizing circuit for the "off" relay 33 to energize the rheostat solenoid to thereby return the rheostat cross-head to initial position. The "inching" switch 30 acts through an electromganetic relay 35 to energize the main relay 32 for energization of the main switch 16 of the small motor. Under these conditions the small motor operates alone, the rheostat remaining inert and the motor L idle. The "safe" switch 31 acts through an electromagnetic relay 36 to interrupt the line connection of the windings of "on" relay 23 and "inching" relay 35 thereby positively insuring against starting of either motor until said "safe" switch is again thrown to open position. The limit switch 25 associated with the rheostat serves to interrupt the energizing circuit of "off" relay 33 when the cross-head is lifted to its initial position and the switch 26 upon closing serves to establish a maintaining circuit including a resistance 37 for the main relay 32 independent of "on" switch 23.

The controller includes an overload switch OL having an operating winding 38 in series with the large motor L and a second overload switch OL having an operating winding 39 in series with the small motor S. These overload switches are connected in series with one another and also in series with the winding of main relay 32 through "stop" relay 34. In consequence, opening of either overload switch will deënergize the main relay 32 thereby effecting disconnection of both motors from circuit and return of the rheostat cross-head to initial position, as already described. Still further, the controller includes a web or paper-break switch 40 which is normally open and which closes upon breakage of the paper passing through the press. This switch, through its contact 40ª and a lamp switch 41 associated with main switch 15 of the large motor L, parallels the "stop" push-button switch 29 thereby functioning like said switch to stop the drive. However, the lamp switch 41 is so associated with the large motor switch 15 that the former is opened upon opening of the latter so that the "stop" relay circuit established by the paper break switch is interrupted as soon as the large motor is stopped. Under the conditions the "off" relay will be maintained energized to restore the rheostat cross-head to initial position and thereupon the small motor may be restarted for remedying the paper breakage. But the large motor will obviously be inoperative until the paper breakage is repaired and the switch 40 is restored to open position. Paper break switch 40 also acts through its contact 40ᵇ to energize a coil 42 provided to operate a paper break recording mechanism. Again, with certain types of presses it is desirable to provide an electromagnetically controlled mechanical brake to act directly on the press and for this purpose a coil 43 has been provided in the dynamic braking circuit of the large motor L. The coil will thus be energized by the braking current and when so energized will be employed to apply the mechanical brake. By energizing the brake coil in this manner its action in applying the brake will obviously be limited to the dynamic braking period of the motor and at the expiration of this period said coil will automatically release the brake.

The circuit connections illustrated in Fig. 2 are as follows: The circuit for the small motor S extends from line 44 by conductor 46 through overload coil 39, by conductor 47 through main switch 16 to and through the armature $a$ and series field $f$ of said motor and thence through resistance 18, by conductor 48 to line 45, the shunt field of said motor being connected between line 44 and conductor 48. The circuit of the large motor extends from line 44 by conductor 49 through overload winding 38, by conductor 50 through main switch 15, by conductor 51 through the armature $a$ and series field $f$ of said motor, by conductor 52 through the left hand armature resistance $r$ and the extreme contact parts of cross-head 19 to and through the right hand armature resistance $r$ by conductor 53 to line 45. The circuit of the shunt field $f'$ of this motor extends from line 44 by conductor 54 through said shunt field, by conductor 55 through the field resistance $r'$ or the parallel path provided by the intermediate contact parts of the cross-head 19 and rheostat segments to conductor 56 and thence by conductor 53 to line 45. Thus, as above set forth, the cross-head serves to vary both the armature resistances $r$ and the field resistances $r'$, the contact arrangement of the rheostat being so obvious as to require no further description.

All of the switches of the push-button station are connected by a common lead 57 to line 44 and when the "on" switch 27 is closed circuit is completed from said lead by conductor 58 through the winding of "on" relay 23 by conductor 59 through "safe" relay 36, by conductor 60 to line 45. Relay 23 thus responds and upon responding completes circuit from line 44 by conductor 46 through the overload switches OL in series, by conductor 62 through "stop" relay 34, by conductor 63 through the winding of main relay 32, by conductors 64 and 65 through said relay 23 by conductor 66 through auxiliary contacts 67, 24 and 68 of the rheostat, by conductor 69 to line 45. This in turn effects response of main relay 32 which completes circuit from line 44 through both overload switches and "stop" relay 34 as already traced, by conductors 63 and 70 through the main relay 32, by conductor 71 through the winding of switch 16, by conductors 72, 73 and 74 through auxiliary contacts 75, 24 and 68 of the rheostat to conductor 69 and thence to line 45. This effects response of switch 16 which completes the circuit of motor S as already traced. Also, response of "on" relay 23 trips the latching pawl 22 of the rheostat which allows the rheostat cross-head to descend and upon this operation of the cross-head its auxiliary contact 24 passes from the contact 75 onto an elongated contact 76 which inserts a resistance 77 in circuit with the winding of switch 16. This resistance serves, in the event of deënergization of switch 16, to necessitate the return of the contact 24 and in consequence return of the rheostat cross-head to initial position prior to subsequent energization of said switch 16. Also, upon initial descent of the cross-head switch 26 associated therewith closes and establishes a connection from conductor 64 by conductor 78 through said switch and through resistance 37, by conductors 56 and 53 to line 45, whereby the main relay 32 is maintained energized independently of the "on" relay and auxiliary contacts 24 and 67 of the rheostat. However, continued withdrawal of the pawl 22 from latching position is dependent upon continued energization of the "on" relay, and, assuming that this relay is maintained energized by continued depression of the "on" push-button, then the rheostat cross-head will continue to descend until its auxiliary contact 24 bridges contact 68 with contact 80 to energize the main switch 15 of large motor L. This energizing circuit may be traced as already described to and through main relay 32 by conductor 71 through the winding of switch 15, by conductor 81 to auxiliary contact 80 of the rheostat and thence through bridging contact 24 to contact 68, by conductor 69 to line 45. The large motor is thus set in operation and thereafter continued descent of the rheostat cross-head serves to accelerate said motor as already set forth. At the same time the auxiliary contact 24 of the rheostat passes off of contact 80 and onto a contact 83 to insert a resistance 84 in circuit with the operating winding of the main switch 15 of the large motor. Moreover, the auxiliary contact 24 passes from the contact 76 onto a contact 85 and then off of the latter contact to progressively short-circuit the resistance 77 from the energizing circuit of switch 16 and to interrupt said energizing circuit thereby deënergizing switch 16 and disconnecting the small motor from circuit.

Assuming now that the motor L is in operation and that the "off" push-button 28 is depressed, circuit will be closed from line 44 by conductor 57 through said switch, by conductor 86 through the winding of "off" relay 33, by conductors 87 and 69 to line 45. Relay 33 thereupon responds and completes circuit from line 44, by conductors 88 and 89 through the operating solenoid of the rheostat to conductor 87 and thence to line 45. The rheostat cross-head is thereby raised to slow down the large motor and, if the push-button is held depressed for a sufficient time to stop the large motor, then just prior to stopping the same it will effect restarting of the small motor through engagement of the auxiliary contacts 24 and 85 of the rheostat.

Assume now that the motor is in operation and that the "stop" pushbutton switch is operated. This completes circuit from line 44 by conductor 57 through said switch, by conductor 90 through the winding of "stop" relay 34, by conductors 91 and 69 to line 45. This effects response of relay 34 which opens the energizing circuit of main relay 32 which in turn interrupts the feed to the windings of the main switches of both motors. This obviously stops the press or other driven mechanism and when the "stop" push-button is released relay 34 recloses and then circuit may be traced through the overload switches and said relay 34 by conductors 63 and 70 through the down contacts of main relay 32, by conductor 93 through the limit switch 25 of the rheostat, by conductor 94 through the winding of "off" relay 33 to line 45 as already traced. Relay 33 thereupon responds and completes the circuit of the lifting solenoid 20 to restore the crosshead to initial position, whereupon the limit switch 25 is opened to deënergize the "off" relay and in turn the lifting solenoid.

Assume now that the rheostat is in initial position and the "inching" push-button 30 is pressed. This completes circuit from line 44 by conductor 57 through said switch 30, by conductor 95 through the winding of "inching" relay 35, by conductor 59 through the "safe" relay to line 45. Relay 35 thereupon responds and parallels the "on" relay 23 to effect progressive energization of the main relay 32 and the main switch 16 of the small motor S as already described. The "inching" relay, as is apparent, is only effective in initial position of the rheostat.

The "safe" push-button switch 31 when closed completes circuit from line 44 by conductors 57 and 96 through the winding of "safe" relay 36 to line 45. Relay 36 upon response interrupts circuit between conductors 59 and 60 and thereby prevents energization of either the "on" relay winding or the "inching" relay winding and thereby effectually locks the controller against starting of either motor.

With either motor in operation response of either overload switch OL obviously serves to deënergize main relay 32 and thereby effect interruption of the circuit of the running motor. The paper break switch 40, as above described parallels the "stop" switch through lamp switch 41 and thus serves to energize the stop relay. This circuit may be traced from contact 40ª by conductor 97 through lamp switch 41 by conductor 98 to conductor 90 and thence through the winding of relay 34. In addition the paper break switch completes circuit from line 44 by conductor 57 to and through the coil 42 of the recording mechanism, by conductors 91 and 69 to line 45. The dynamic braking circuit for the large motor, as above set forth, is completed by the down contacts of the switch 15 and extends through the brake coil 43 and resistance 17 in series.

It will thus be apparent that the use of the typical form of controller just described for each of the three motor sets of Fig. 1 presents numerous problems in the matter of control commutation. For example, each press unit must be provided with one or more push-button control stations and one or more paper break switches to act upon whatever motor set happens to be selected for the drive of such press unit. Again, if one press unit is driven by two or more motor sets jointly then each of its push-button control stations and paper break switches must be rendered effective as to all of such driving sets and if two or more press units are jointly operated by one or more motor sets then the control switches of all of such press units must be individually rendered effective as to the common driving set or sets. Again, where the driving sets are mechanically combined for joint use then the overload switches of each set must be rendered effective as to each of such sets. Also, under such conditions some provision should be made for equalizing the driving sets in their different combinations. Still further, where each press unit is provided with a magnetically controlled brake then provision must be made for rendering the various brake coils responsive to the braking current of the motor selected for driving its respective press unit. It will thus be apparent that even a limited number of driving combinations require a great flexibility of control and that such flexibility requires a wide range of coördination and interchangeability. Moreover, it will be apparent that it would be impractical to attempt illustration in the accompanying drawings of a full wiring diagram for such a controller as that hereinafter described, but the general plan of wiring will be readily understood from Fig. 3.

Referring to Fig. 3 the same illustrates schematically the three motor sets M′, M² and M³ with control panels C′, C² and C³ therefor respectively and the six press units P′ to P⁶ inclusive with a push-button control station PB, a paper break switch 40 and a brake coil 43 for each of the units. Also, this view illustrates schematically a plurality of pairs of control switches for operative association with the mechanical connectors shown in Fig. 1. The motor sets and press sections are laid out in the same relation as in Fig. 1 and the switches mentioned are laid out to correspond with the connector arrangement shown in Fig. 1, while the switches have been given the reference character of their respective connectors with exponents $a$ and $b$ to identify the two switches of each pair. As will hereinafter appear, each of the switches mentioned is of the single throw type to be thrown to closed position upon movement of its respective connector to operative position and to be thrown to open position upon reverse operation of its respective connector. Still further, this figure shows three additional switches 100, 101, and 102 which, as will hereinafter appear, are also operatively associated with the mechanical connectors of Fig. 1 and are of the two-position type to be selectively operated upon operation of the connectors in different combinations. In view of the complexity of the circuit connections controlled by the various switches mentioned these connections have in this view merely been illustrated in the form of cables which will serve to give a general understanding of the use and functions of the various switches.

The switches $1^a$ to $7^a$ inclusive provide for interconnection or commutation of the push-button stations and paper break switches of the several press units for all of the above specified variations in driving connections. As the connectors are thrown to select the motor set or sets for driving a certain press unit or combination of units, so also these switches associated with and controlled by said connectors as hereinafter described act to establish suitable electrical connections between the push-button switches and paper break switches of such press unit or units, with the control panel or panels of the selected motor set or sets. For example, if the connector 1 is operated to operatively connect the motor set M' to the press unit P' then the switch $1^a$ electrically connects the push button station and paper break switch of press unit P' to the control panel C' of said motor set. Again, assuming that connectors 2 and 7 are thrown to connect press units P' and $P^2$ to the motor set $M^2$, then the switches $2^a$ and $7^a$ connect the push-button stations and paper break switches of said two press units to the control panels $C^2$ of said motor set. Again assuming that connectors 1, 7 and 2 are operated to connect press units P' and $P^2$ for joint operation by the two motor sets M' and $M^2$, then the switches $1^a$, $7^a$ and $2^a$ act to connect the push-button stations and paper break switches of both press units to the control panels of both motor sets and in a manner whereby the push-button stations and paper break switches of each press unit will act jointly or in the same manner upon the two motor sets. The general scheme or use and function of the switches $1^a$ to $7^a$ will thus be readily apparent without further specific examples. With the form of controller herein selected the push-button stations of the several press units are paralleled with one another for control of any single motor set and where a number of stations are employed to jointly control a plurality of motor sets then the leads from said stations are carried in parallel to the several panels of the selected motor sets. The same system of inter-connections applies to the paper break switches and the cable connections shown are illustrative of this system. As will be readily apparent, the cable connections between the switches $1^a$ to $7^a$, assuming all of said switches to be closed, form a loop with a tap to each control panel and to each of the push-button stations and paper break switches. In consequence, it will readily be apparent that with the taps extending from the loop as indicated, proper connections may be made for any of the above specified variations in drive and it will also be readily apparent that further variations in drive and inter-connections of the push-button stations and paper break switches may be provided for by the addition of connectors and similar connector switches.

The switches $1^b$ to $7^b$ serve to control the inter-connections of the brake coils in a similar manner to the control of the push-button stations by the switches $1^a$ to $7^a$. That is to say, they serve to parallel any one of the brake coils with any other brake coil or to connect any brake coil in the dynamic braking circuit of the large motor of any one of the three motor sets. The switches $1^b$ to $7^b$ operate simultaneously with their respective switches $1^a$ to $7^a$ and might be combined therewith, but the same have been shown as separate switches in view of the fact that the switches $1^b$ to $7^b$ control circuits carrying heavy currents. The system of connecting switches $1^b$ to $7^b$ with one another and with the brake coils and control panels is similar to that already described in connection with the switches $1^a$ to $7^a$ and therefore requires no further description at this time.

The switches 100, 101 and 102 control the inter-connections of the overload switches of the three motor sets and serve upon connection of two or more motor sets to render the overload switches of each set also effective as to the other set or sets. The overload switches for the several sets are mounted on the control panel and are independent of the press sections so that the same only require inter-connections and connections with the control panels as indicated by the cables. Switches 100, 101 and 102 also serve to control or to operate other switches to control means for equalizing the motor sets when connected for joint drive as will hereinafter appear.

Referring now to Figs. 4 and 5 the same illustrate in further detail the switches $1^a$ to $7^a$ and the inter-connections between the push-button stations and said switches and between the control panels and said switches. The former view shows the complete circuit arrangement for one push-button switch of each press unit while the latter view shows the complete connections between switches 1ᵃ and 3ᵃ and their respective push-button switches, paper break switches and the control panel C'. Thus the two views jointly serve to illustrate the complete circuit diagram for the parts of the controller under discussion.

As shown in Fig. 4, switch 3ᵃ is typical of all of the switches 1ᵃ to 7ᵃ and comprises a circular base 110 having thereon twenty-two contacts 111 to 132 arranged in pairs to be bridged by a revoluble contact spider 133, the arms of said spider being insulated from one another and being operable by an electromagnetic winding as will hereinafter appear. Sixteen of these contacts are employed for the connections of the push-buttons and paper break switches, as will be described in connection with Fig. 5, while the remainder are used for connections hereinafter set forth.

Fig. 4 shows all three control panels and the "on" push-buttons 27 of all six control stations of Fig. 3. The interconnections between these push-buttons and the control panels are controlled by contacts 111, 112, 113 and 114 of the switches 1ᵃ to 7ᵃ and hence for simplicity each of the switches 1ᵃ, 2ᵃ and 4ᵃ to 7ᵃ have been represented by the aforesaid contacts. Commencing with switches 1ᵃ and 3ᵃ the contacts 111 and 113 thereof are cross-connected, with a tap from the connection of contacts 111 to the "feed" terminal of panel C' and a tap from the connection of contacts 113 to the "on relay" terminal of said panel. Then continuing counter-clockwise the contacts 112 and 114 of switch 1ᵃ are cross-connected with the corresponding contacts of switch 7ᵃ and respectively connected with the contacts of the push-button switch or press unit P'. Switch 7ᵃ in turn has its contacts 111 and 113 cross-connected with the contacts 112 and 114 of switch 2ᵃ and respectively connected with the contacts of the push-button switch of press unit P². Switch 2ᵃ in turn has its contacts 111 and 113 cross-connected with the corresponding contacts of switch 4ᵃ and respectively connected to the feeder terminal and "on relay" terminal of panel C². Then continuing the inter-connections, switch 4ᵃ has its contacts 112 and 114 connected to the corresponding contacts of switch 6ᵃ and respectively connected with the contacts of the push-button switch of the press unit P⁴. The switch 6ᵃ has its contacts 111 and 113 cross-connected with the corresponding contacts of switch 5ᵃ. Also, switch 6ᵃ has leads from its contacts 111 and 112 to the feeder terminal and "on relay" terminal of control panel C³ and to the push-button switches of press units P⁵ and P⁶. Finally, switch 5ᵃ has its contacts 112 and 114 cross-connected with the corresponding contacts of switch 3ᵃ and respectively connected to the contacts of the push-button switch of press section P³. It will thus be readily apparent that the connections described afford means for establishing connections from any push-button switch to any control panel and to all combinations of such panels as may be required by the variation in driving connections. The connections just described for the push-button switches 27 are typical of the connections for all remaining push-buttons and also for the paper break switches as will be readily apparent from Fig. 5.

Fig. 5 shows the same connections for the "on" push-button switches as those above described and corresponding connections for all remaining push-buttons. It will be observed, however, that all of the push-button switches are connected to the same feed wire and hence require only one additional pair of contacts for the control thereof. Also, the connections for the paper break switches are similar to those illustrated in Fig. 4, but to avoid any misunderstanding the same will be more specifically described. These paper break switches are, as above set forth, connected to the feeder of their respective push-button stations and the two circuits extending from their stationary contacts are controlled by contacts 123 to 126 of the switches 1ᵃ to 7ᵃ. Considering the switches 1ᵃ and 3ᵃ of Fig. 5 it will be observed that these latter switches have cross-connections between their contacts 123 and 125 which cross-connections are in turn respectively connected to separate terminals of control panel C'. These connections, it will be observed, are identical with the corresponding connections of the push-button, Fig. 4. Then, further tracing the paper break switch connections, it will be observed that the two contacts 40ᵇ and 40ᵃ of each are respectively connected to the two contacts 124 and 126 of the switches 1ᵃ and 3ᵃ, which contacts it will be understood cross-connected with contacts of other switches in the same manner as shown in Fig. 4.

Fig. 6 shows in detail the control of the brake coils 43 which coils, as above set forth, are controlled by switches 1ᵇ to 7ᵇ operable with the switches 1ᵃ to 7ᵃ respectively. As schematically illustrated in Fig. 6 each of the switches 1ᵇ to 7ᵇ is of the double-pole type having poles 134 and 135. Also, switch 3ᵇ is illustrated as operatively connected with switch 3ᵃ and as provided with an operating winding 136, which winding thus serves to operate both switches and it will be understood that the remainder of the switches may be of like form to be electrically controlled as hereinafter set forth. The inter-connections of switches 1ᵇ to 7ᵇ with one another and with the brake coils are similar to the inter-connections of the switches 1ᵃ to 7ᵃ with one another and with one set of the push-buttons of the several stations. Beginning with switch 1ᵇ, a closed loop may be traced from the left hand side of its pole 134 through the corresponding poles of the remaining switches and back to the right hand side of its pole 134. A similar closed loop may be traced through poles 135 of said switches and the brake coils for the several press units are connected between said loops in the same relation with said switches as the push-button stations with relation to switches 1ᵃ to 7ᵃ. Further, the loops are tapped to opposite terminals of the large motor armatures of all the motor sets through the switches 15 on one side and resistances 17 on the other side. It will thus be apparent that the switches 1ᵇ to 7ᵇ provide for the connection of each brake coil to any motor set and as above set forth for paralleling a number of brake coils in the braking circuit of either motor set as may be required according to the driving connections established.

Fig. 7 shows in detail the variable connections for the overload switches which, as above set forth, are controlled by the switches 100, 101 and 102 in turn responsive to different combinations of the mechanical driving connections. For simplicity the view has been curtailed to show only the overload switches, the windings of the "main" relays 32, the "stop" relays 34 of the several control panels and the contacts of the switches 100, 101 and 102, which switches are similar to switches 1ᵃ to 7ᵃ. More specifically the switches 100 to 102 are of like construction each being provided with nine contacts 140 to 148 divided into three sets of three contacts each. These contacts, like the contacts of switches 1ᵃ to 7ᵃ, are adapted to be bridged by insulated arms of a revoluble spider 150, the arrangement being such that in normal position the several switches will bridge their contacts 140 and 141, 143 and 144, and 146 and 147. These switches are so connected with the overload switches and the relays controlled thereby and also with one another that in normal position of all, the several relays will be subjected only to control by their respective overload switches. On the other hand, the inter-connections are such that operation of the switch 100 will place the overload switches of panels C' and C² in series with one another and with the main relay windings of both of said panels in parallel. Switch 101, on the other hand, when operated with the two remaining switches in normal position will connect the overload switches of panels C² and C³ in series with one another and with the main relay windings of both of said panels in parallel, while the switch 102 when operated with the two remaining switches in normal position will connect the overload switches of panels C' and C³ in series with one another and with the main relay windings of both of said latter panels in parallel. Finally the three switches when simultaneously operated will place the overload switches of all three panels in series with one another and with the relay windings of all three panels in parallel. These connections may be traced as follows: Assuming that all switches are in normal position, circuit may be traced from the overload switches of panel C' by conductor 150 through contacts 141 and 140 of switch 100, by conductor 151 through the corresponding contacts of switch 102, by conductor 152 through the contacts 143 and 144 of switch 100, by conductors 153 and 154 through switch 34 to the main relay winding 32 of panel C'. Circuit for the overload switches of panel C² may under such conditions be traced from the line through contacts 146 and 147 of switch 100, by conductor 155 through said overload switches, by conductor 156 through the contacts 141 and 140 of switch 101, by cross-connector 157 to contact 143 of said switch and thence to contact 144 by conductors 158 and 159 through switch 34 to the main relay coil 32 of said panel C². The circuit of the overload switches of panel C³ may be traced from the line by conductor 160 through the contacts 146 and 147 of switch 101, by conductor 161 through the corresponding contacts of switch 102, by conductors 162 and 163 through said overload switches, by conductor 164 through switch 34 to the main relay coil 32 of said panel C³.

With the switch 100 operated and the other two switches in normal position, the circuit extends from the overload switches of panel C', by conductor 150 through contacts 141 and 142 of switch 100, by cross-connector 165 to contact 147, by conductor 155 through the overload switches of panel C², by conductor 156 through the contacts 141 and 140 of switch 101, by cross-connector 157 through contacts 143 and 144 to conductor 158 where the circuit divides, one branch extending by conductor 159 through switch 34 to the main relay coil of panel C², while the other branch extends from the conductor 158 by conductor 166 through contacts 145 and 144 of switch 100, by conductors 153 and 154 through switch 34 to the main relay coil of panel C'. With switch 101 operated and the remaining two switches in normal position circuit extends as already traced to and through the overload switches of panel C², by conductor 156 through contacts 141 and 142 of switch 101, by conductor 163 to and through the overload switches of panel C³, by conductor 164 where the circuit divides, one branch going directly through switch 34 to the main relay winding 32 of panel C³ while the other branch extends from conductor 164 by conductor 167 through contacts 145 and 144 of switch 101, by conductors 158 and 159 through switch 34 to the main relay coil 32 of panel C². With switch 102 operated and the remaining two switches in normal position circuit extends from the overload switches of panel C' through the switch 100 as already traced, by conductor 151 to contact 140 of switch 102, by cross connector 169 through contacts 148 and 147, by conductors 162 and 163 through the overload switches of panel C³ to conductor 164 where the circuit divides, one branch extending directly through switch 34 to the main relay coil 32 of panel C³ and the other branch extending by conductors 167 and 170 through the contacts 145 and 144 of switch 102, by conductors 171 and 154 through switch 34 to the main relay coil of panel C'. With all three switches operated then circuit extends from the overload switches of panel C' by conductor 150 through contacts 141 and 142 of switch 100, by cross-connector 165 to contact 147, by conductor 155 through the overload switches of panel C², by conductor 156 through contacts 141 and 142 of switch 101, by conductor 163 through the overload switches of panel C³ to conductor 164 where the circuit divides, one branch extending directly through switch 34 to the main relay coil 32 of panel C³. From conductor 164 circuit also extends by conductor 167 to and through the switch 101 as already traced to the relay coil of panel C² and to and through the switch 102 to the relay coil of panel C'.

As above described, when the motor sets are connected for joint operation it is desired to employ equalizing switches for such motor sets and these switches are depicted in Fig. 8. This view shows the rheostats of the three control panels and shows equalizing switches 180, 181 and 182 to establish equalizing connections between the rheostats of the motor sets when connected for joint operation. These switches are operable with the overload commutating switches and hence in accordance with the mechanical combinations of the motor sets. Switch 180 is operated with the switch 100 and when so operated establishes an equalizing connection between the rheostats of control panels C' and C². Switch 181 operates with switch 101 to establish an equalizing connection between the panels C² and C³ while switch 182 operates with switch 102 to establish a similar connection between panels C' and C³. Thus it will be observed that each equalizing switch is associated with the overload commutating switch acting for the corresponding mechanical combination of the motor sets and when all three of the overload commutating switches are operated all three of the equalizing switches are likewise operated to establish connections which will equalize all three motor sets.

It will thus be apparent that the ten commutating or inter-connecting switches will give all combinations of control necessary for the mechanical combinations described in connection with Fig. 1. They will place each press unit at all times under the control of its respective control switches, namely its push-button and paper break switches. Also, they will at all times connect the brake coil of each press unit to the motor set or sets driving that particular unit. Still further, they will at all times place each motor under the control of its respective overload switches and under the control of those of any jointly acting motor sets and will establish suitable equalizing connections for all mechanical combinations of the motor sets.

Referring now to Fig. 9, the same shows the seven combined switches for commutating the push-button stations and paper break switches and for convenience and brevity these switches will now be referred to as $1^{ab}$ to $7^{ab}$. As above set forth, each of these switches is provided with an operating coil 136 and these coils are in turn controlled by switches operable by the mechanical couplings of Fig. 1. These switches are designated as $1^c$ to $7^c$ and, as will be understood, each is adapted to be closed by movement of its respective coupling to operative position and upon closure to energize its respective switch $1^{ab}$ to $7^{ab}$. This, as will be apparent from the foregoing description, will provide for automatic interconnection of the push-button stations and paper break switches upon variations in the mechanical driving connections. The control circuits for the switches $1^{ab}$ to $7^{ab}$ have been illustrated by heavy lines to distinguish the same from the other circuits shown and they are so obvious as to require no specific description. As will be apparent, each of the switches $1^c$ to $7^c$ connects the operating winding of its respective switch $1^{ab}$ to $7^{ab}$ directly across the supply lines. Of course, if preferred the switches $1^{ab}$ to $7^{ab}$ might be mechanically operated by their respective couplings.

Still referring to Fig. 9, the same also shows the combined switches 100, 101 and 102 and 180, 181 and 182, which for convenience will now be designated by the latter numbers. Each of these switches is provided with an operating winding 200 and these windings are illustrated as controlled by the switches $1^a$ to $7^a$. More specifically they are controlled by contacts 127 to 132 of said switches $1^a$ to $7^a$, these contacts being the remainder of the twenty-two contacts above specified as being provided on each of the latter switches. In general, the switch 180 which as above set forth is to be operated upon connection of motor sets M' and M² is so controlled by the switches 1ᵃ to 7ᵃ as to be energized upon joint response of switches 1ᵃ, 7ᵃ and 2ᵃ, or joint response of switches 3ᵃ, 5ᵃ, 6ᵃ and 4ᵃ, which represent the two alternative combinations of couplings for connecting the motor sets M' and M². The switch 101 which as above set forth, is to respond upon mechanical connection of motor sets M² and M³, is so controlled as to respond upon joint operation of switches 4ᵃ and 6ᵃ or upon joint operation of switches 2ᵃ, 7ᵃ, 1ᵃ, 3ᵃ and 5ᵃ which represent the two alternative mechanical combinations for the motors M² and M³. Switch 182, which as above set forth, is to respond upon inter-connection of motor sets M' and M³, is so controlled as to respond upon joint operation of switches 3ᵃ and 5ᵃ or joint operation of switches 1ᵃ, 7ᵃ, 2ᵃ, 4ᵃ and 6ᵃ. On the other hand, the connections are such that upon response of all of the switches 1ᵃ to 7ᵃ all three of the switches 180, 181 and 182 will respond, which is the condition desired. Thus the control means also renders automatic the establishment of the equalizing connections and the interconnections of the overload switches.

The energizing circuits for the switches 180, 181 and 182 may be readily traced as follows: All three of the windings of these switches are connected by a conductor 201 to the right hand side of the line. Considering first the energizing circuits of switch 180, one may be traced from the winding of said switch by conductor 202 through the contacts 127 and 128 of switch 2ᵃ, by conductor 203 through the corresponding contacts of switch 7ᵃ, by conductor 204 through the corresponding contacts of switch 1ᵃ, by conductor 205 to the left hand side of the line. The alternative circuit of this winding extends therefrom by conductor 206 through contacts 127 and 128 of switch 4ᵃ, by conductor 207 through the corresponding contacts of switch 6ᵃ, by conductor 208 through the corresponding contacts of switch 5ᵃ, by conductor 209 through the corresponding contacts of switch 3ᵃ, by conductors 210 and 205 to the left hand side of the line. Considering next the winding of switch 181, one circuit therefor extends by conductor 211 through the contacts 129 and 130 of switch 6ᵃ, by conductor 212 through the corresponding contacts of switch 4ᵃ, by conductors 213, 214 and 215 to the left hand side of the line. The alternative circuit extends therefrom by conductors 211 and 216 through contacts 129 and 130 of switch 5ᵃ, by conductor 217 through the corresponding contacts of switch 3ᵃ, by conductor 218 through the corresponding contacts of switch 1ᵃ, by conductor 219 through the corresponding contacts of switch 7ᵃ, by conductor 220 through the corresponding contacts of switch 1ᵃ, to conductor 213 and thence to the left hand side of the line. Finally, considering the winding of switch 182, one circuit extends therefrom by conductors 221 and 222 through the contacts 131 and 132 of switch 5ᵃ, by conductor 223 through the corresponding contacts of switch 3ᵃ, by conductors 224 and 225 to the left hand side of the line. The alternative circuit for this winding extends therefrom by conductors 221 through the contacts 131 and 132 of switch 6ᵃ, by conductor 226 through the corresponding contacts of switch 4ᵃ, by conductor 227 through the corresponding contacts of switch 2ᵃ, by conductor 228 through the corresponding contacts of switch 7ᵃ, by conductor 229 through the corresponding contacts of switch 1ᵃ, by conductor 205 through the corresponding contacts of switch 1ᵃ to the left hand side of the line. Obviously, therefore, when all of the switches 1ᵃ to 7ᵃ are closed the windings of all three of the switches 180, 181 and 182 will be energized.

Thus the wide range of flexibility of control afforded by the means described and the ready adaptability of such means to other uses and to use for varying the numbers of driving and driven units will be apparent. Also, it will be apparent that the system illustrated is susceptible of various modifications without departing from the scope of the appended claims and it is to be understood that as employed in such claims the terms "drives" and "driving units" are not in themselves limited to the two-motor type of drive.

What I claim as new and desire to secure by Letters Patent is:

1. In combination, a plurality of driven units, a plurality of motor driving units therefor, drive commutating means to utilize said driving units separately or jointly with respect to said driven units and commutatable control means for said driving units including a control station for each of said driven units, said control means being commutatable to give the station of each driven unit complete control of the one or more driving units connected with such driven unit.

2. The combination with a plurality of driven units, of a plurality of motor driving units therefor, drive commutating means to utilize said driving units separately or jointly with respect to said driven units and commutatable control means for said motor driving units including a control station for each of said driven units, said control means being commutatable to place the driving unit or units operating each driven unit under the control of the station of such unit and to restrict each of said stations to control of the driving unit or units acting upon its respective driven unit.

3. In combination, a driven unit, a plurality of motor driving units therefor, commutatable driving connections between said driven and driving units and commutatable control means for said driving units including a control station for said driven unit, said control means being commutatable with said connections to place said driving units jointly under the control of said station or to restrict said station to the control of one of said driving units.

4. In combination, a driven unit, a plurality of motor driving units therefor, commutatable driving connections between said driven and driving units and commutatable control means for said driving units including a control station for said driven unit, said control means being commutatable to place said driving units jointly under the control of said station and to selectively remove one of said driving units from the influence of said station while maintaining the remainder thereof under the influence of said station.

5. In combination, a plurality of driven units, a plurality of motor driving units therefor, commutatable connections for effecting joint operation of said driven units by said driving units jointly or independent operation of said driven units each by certain of said driving units and commutatable control means for said driving units including a control station for each of said driven units, said control means being interconnected with said commutatable connections to give each of said control stations control over all of said driving units for joint operation of said driven units as aforesaid, and to remove each of said driving units from the influence of all stations except that of its respective driven unit for independent operation of said driven units as aforesaid.

6. In combination, a plurality of driven units, a plurality of motor driving units therefor, commutatable connections for effecting joint operation of said driven units by said driving units jointly or independent operation of said driven units by said driving units individually and selectively and commutatable control means for said driving units including a control station for each of said driven units, said control means being interconnected with said commutatable connections to give the control station of each driven units control over the driving unit or units acting upon its respective driven unit and as each of said driving units is mechanically disconnected from one of said driven units to remove such driving unit from the influence of the control station of such driven unit.

7. In combination, a plurality of driven units, a plurality of motor driving units therefor, commutatable connections for effecting operation of said driven units by said driving units either separately or jointly, automatic controlling means for said driving units providing for independent control thereof, a control station for each of said driven units and means to commutate the connections between said control stations and said automatic controlling means in accordance with the commutation of said connections to give the station of each driven unit control over the one or more driving units connected to such driven unit.

8. In combination, a plurality of driven units, a plurality of motor driving units, commutatable means to connect said driven and driving units in different combinations, an automatic controller for each of said driving units, a control station for each of said driven units and means commutatable with said former means to connect said automatic controllers to different or common control stations.

9. In a system of control for a plurality of motor drives, in combination, a plurality of automatic controllers one for each drive, a control station and commutatable connections between said controllers and said station to effect either selective individual or joint control of the former by the latter.

10. In a system of control for a plurality of motor drives, in combination, a plurality of automatic controllers one for each drive, a plurality of control stations and commutatable connections between said controllers and said stations to connect the same in different combinations including the connection of a plurality of said controllers to a common station.

11. In a system of control for a plurality of motor drives, in combination, a plurality of automatic controllers one for each drive, a plurality of control stations and commutatable connections between said controllers and said stations including switches to connect the same in different combinations including the connection of a plurality of controllers to each of a plurality of said stations.

12. In a system of control for a plurality of motor drives, in combination, a plurality of automatic controllers one for each drive, a plurality of control stations and commutatable connections between said controllers and said stations including switches enabling the connection of a plurality of controllers or stations to a single one of the other.

13. In a system of control for a plurality of motor drives, in combination, a plurality of automatic controllers, one for each drive, a plurality of control stations and commutatable connections between said controllers and said stations including switches enabling the connection of a plurality of said controllers or stations to a single one or each of a plurality of the other.

14. In a system of control for a plurality of motor drives, in combination, a plurality of automatic controllers, one for each drive, a plurality of control stations and commutatable connections therebetween providing for connection of a plurality of one to one of a plurality of the other selectively.

15. In a system of control for a plurality of motor drives, in combination, a plurality of automatic controllers, one for each drive, a plurality of control stations and commutatable connections therebetween providing for connection of a plurality of either to one of a plurality of the other selectively.

16. In a system of control for a plurality of motor drives, in combination, a plurality of electromagnetic power controllers for the several drives, a plurality of control stations and commutating switches to connect said controllers and stations in different combinations including the connection of a plurality of said controllers in parallel to each of a plurality of said stations.

17. In a system of control for a plurality of motor drives, in combination, a plurality of electromagnetic controllers for the several drives, a plurality of control stations, and commutating switches normally disconnecting said controllers and said stations, said switches being operable in different combinations to connect said controllers and said stations in correspondingly different combinations.

18. In a system of control for a plurality of motor drives, in combination, a plurality of electromagnetic power controllers for the several drives, a plurality of control stations, and a plurality of commutating switches operable in different combinations to connect said controllers and said stations in correspondingly different combinations including paralleling of either with respect to the other.

19. In combination, a plurality of driven and motor driving units, drive commutating means therebetween to connect said units in different combinations, an electromagnetic controller for each of said driving units, a control station for each of said driven units, and means commutatable with said drive commutating means to connect said automatic controllers and stations in different corresponding combinations, one including connection of a plurality of said controllers in parallel to a common station.

20. In combination, a plurality of driven and motor driving units, drive commutating means therebetween to connect said units in different combinations, an electromagnetic controller for each of said driving units, a control station for each of said driven units and means commutatable with said drive commutating means to connect said automatic controllers and stations in different combinations corresponding with the drive commutation, said combination including paralleling of a plurality of said controllers to be governed from a common station and paralleling of a plurality of said stations for governing a common controller.

21. In combination, a driven mechanism, motor driving means therefor, variable driving connections therebetween, commutatable control means for said motor driving means and commutating means for said control means operatively associated with said driving connections to be governed by the setting of the parts of the latter individually and collectively.

22. In combination, driven and motor driving units, commutatable driving connections for said units and commutatable control means for said units including a plurality of commutating switches directly controlled by said commutatable driving connections and other commutating switches controlled by said former switches jointly.

23. In combination, driven and motor driving units, commutatable driving connections therefor and commutatable control means for said units including switches governed by said commutatable driving connections to jointly effect certain control commutations and other switches controlled by said former switches jointly to jointly effect other control commutations.

24. In combination, driven and motor driving units, driving connections therebetween having commutating couplings and commutatable control means for said units including a series of switches corresponding in number to and operatively associated with said couplings to effect partial control commutation and other switches operatively associated with said former switches to effect further control commutation varying with the ultimately established driving connections.

25. In combination, driven and motor driving units, drive commutating means for said units and control means for said driving units including switches to commutate both power and control circuits, certain of said switches being directly governed by said drive commutating means to effect partial circuit commutation and to jointly control the remainder of said switches to effect further circuit commutation.

26. In combination, driven and motor driving units, drive commutating means therebetween, separate automatic controllers for said driving units, a control station for each driven unit and commutating switches associated with said drive commutating means to commutate the connections between said controllers and said stations and also commutate certain power connections for said driving units.

27. In combination, driven and motor driving units, drive commutating means therebetween, an automatic controller for each of said driving units including an overload device, a control station for each of said driven units, switches associated with said drive commutating means to correspondingly commutate the connections between said controllers and said stations and other switches controlled by said former switches to correspondingly commutate said overload devices.

28. In combination, driven and motor driving units, drive commutating means therebetween, an automatic controller for each of said driving units, a control station for each of said driven units, switches controlled by said drive commutating means to correspondingly commutate the connections between said controllers and said stations and equalizing switches for said motor drives controlled by said commutating switches jointly to establish corresponding equalizing connections.

29. In combination, driven and motor driven units, drive commutating means therebetween, an automatic controller for each of said driving units, a control station for each of said driven units, switches controlled by said drive commutating means to commutate certain control and power connections and other switches controlled by said former switches jointly to correspondingly commutate other control and power connections.

30. In combination, driven and driving units, drive commutating means therebetween, an automatic controller for each of said driving units including an overload protective device, a control station for each of said driven units, an electromagnetically operated brake for each of said driven units to be electrically connected to one of said driving units, commutatable equalizing connections for said driving units, switches controlled by said drive commutating means to correspondingly vary the connections between said controllers and said stations and between said brakes and said driving units and other switches controlled by certain of said former switches jointly to correspondingly interconnect said overload devices and vary said equalizing connections.

31. In a system of control for a plurality of motor drives in combination, a plurality of independent controllers for the drives, each including an automatic stopping device for its respective drive and means to coördinate a plurality of said devices for control by each of the drive of the other.

32. In a system of control for at least three motor drives, in combination, at least three independent power controllers, one for each drive and each including an automatic stopping device for its respective drive and commutatable connections between said automatic stopping devices to coördinate each with either or all remaining devices for common control of their respective drives.

33. In a system of control for a plurality of motor drives, in combination, separate controllers for the several drives each including an overload switch acting thereon to effect interruption of the power supplied by such controller and commutating means for said controllers to render the same responsive to the overload devices of one another.

34. In a system of control for a plurality of motor drives, in combination, separate electromagnetic controllers for the several drives, each of said controllers including a line switch and an overload switch controlling such line switch and commutating means for the overload switches of a plurality of said controllers to subject the line switch of each to the influence of each of said commutated overload switches.

35. In a system of control for a plurality of motor drives, in combination, separate controllers for the several drives each including an overload switch acting thereon to effect interruption of power thereby and commutating means for said controllers including means to connect the overload switches of a plurality of said controllers in series.

36. In a system of control for a plurality of motor drives, in combination, separate controllers for the several drives each including a single pole overload switch to act thereon for interruption of power thereby and means to interconnect such switches of a plurality of said controllers to subject all of the latter to the action of each of the former.

37. In a system of control for a plurality of motor drives, in combination, separate controllers for the several drives each including a single pole overload switch to act thereon for interruption of power thereby, and means to connect such switches of a plurality of said controllers in series to subject all of said controllers to the action of each of the connected switches.

38. In a system of control for a plurality of motor drives, in combination, separate controllers for said drives each including an electro-responsive line switch and a single pole overload switch in series therewith and commutating means to connect the overload switches of a plurality of said controllers in series to control the line switch of each of said controllers.

39. In combination, a plurality of motor drives, independent controllers therefor each including an automatic stopping device, a master controller, and means for jointly subjecting said controllers to the influence of said master controller and for rendering the automatic stopping devices of said controllers each effective as to all of said motor drives.

40. In combination, a driven mechanism, a plurality of motor drives therefor, variable connections between said drives and said driven mechanism, separate controllers for said drives each including an automatic stopping device responsive to abnormal electrical conditions of its respective drive and means associated with said variable connections and governed by the setting thereof to interconnect said automatic stopping devices for control of all of said drives jointly driving said driven mechanism.

41. In combination, a plurality of driven and motor driving units, drive commutating means therebetween, separate controllers for said driving units each including an automatic protective device and means commutatable with said drive commutating means to coördinate said protective devices for a plurality of said driving units.

42. In combination, a plurality of driven and motor driving units, drive commutating means therebetween, separate controllers for said driving units each including an overload device and means commutatable with said drive commutating means to interconnect said overload devices in different combinations or disconnect the same according to the drive commutation.

43. In combination, a plurality of driven and driving units, drive commutating means therebetween including a plurality of independently operable couplings, separate controllers for said driving units each including an overload device, and means to render the overload device of each of said controllers effective as to each of a plurality of said driving units other than its respective driving unit, said last mentioned means being controlled by said couplings jointly to effect overload commutation corresponding to the drive commutation.

44. In combination, three motor driving units, separate controllers therefor each including an electro-responsive protective device normally restricted to the control of one of said driving units, and a corresponding number of independently operable devices providing commutation of said protective devices to render each effective as to its respective driving unit and either or both of the other two of said driving units.

45. In combination, a driven unit, a plurality of driving units, drive commutating means therebetween, a protective control device associated with said driven unit, and means associated with said drive commutating means to render said protective device effective as to the driving unit or units connected to said driven unit but ineffective as to any driving unit not so connected to said driven unit.

46. In combination, a plurality of driven and driving units, drive commutating means therebetween, a protective drive controlling device associated with each of said driven units and means associated with said drive commutating means to render each protective device effective as to the driving unit or units of its respective driven unit and ineffective as to all remaining driving units.

47. In combination, a plurality of driven and driving units, drive commutating means therebetween to effect independent operation of said driven units by separate driving units or joint operation of said driven units by said driving units jointly, a protective drive controlling device associated with each of said driven units and commutating means for said protective devices associated with said drive commutating means to restrict the action thereof to said driving units independently or to give each control over a plurality of said driving units in accordance with the drive commutation.

48. In combination, a plurality of driven and driving units, drive commutating means therebetween, control means for said driving units including a control station for each of said driven units, a protective drive controlling device associated with each of said driven units and means associated with said drive commutating means to render the control station and protective device of each driven unit effective as to the driving unit or units of such station according to the drive commutation.

49. In combination, a plurality of press units, driving units therefor, drive commutating means therebetween, control means for said driving units including a plurality of control stations, one for each of said press units, a paper break switch for each of said press units and means for commutating said control stations and paper brake switches with respect to said driving units according to the drive commutation.

50. In combination, a plurality of motor drives, commutatable control means to provide for independent operation or joint operation thereof and means commutatable with said control means to establish equalizing connections for the drives when operating jointly.

51. In combination, a plurality of motor drives, commutatable control means providing for joint operation thereof in different combinations and equalizing switches for said drives operatively associated with said control means to establish different equalizing connections in accordance with the control commutation.

52. In combination, a plurality of motor drives, separate automatic controllers and control stations therefor, means to commutate the connections between said controllers and said stations for independent and joint control of the former by the latter and means governed by said commutating means to establish equalizing connections for the drives placed under the control of a common station.

53. In combination, a plurality of motor drives, a plurality of separate controllers therefor, a plurality of switches for interconnecting said controllers for joint operation of said drives in different combinations and means controlled by said switches jointly to establish different equalizing connections for said drives in accordance with the control commutation.

54. In combination, a plurality of driven and motor driving units, drive commutating means between said driven and driving units and commutatable equalizing means for said driving units controlled by said drive commutating means.

55. In combination, a plurality of driven and motor driving units, drive commutating means therebetween including a plurality of coupling devices operable in different combinations and a plurality of equalizing devices for said driving units controlled by said coupling devices jointly to effect corresponding commutation.

56. In combination, a plurality of driven and motor driving units, drive commutating means therebetween, commutatable control means for said driving units and commutatable equalizing means for said driving units, all of said commutating and commutatable means being inter-related for corresponding commutations.

57. In combination, a driven unit, a plurality of motor driving units, commutatable driving connections therebetween, an electromagnetically controlled brake for said driven unit, control means for said driving units including a plurality of devices one for each of a plurality of said driving units and each adapted to control the circuit of said brake and means associated with said commutatable driving connections to establish and commutate connections between said brake and said devices whereby the former will be controllable with a driving unit of said driven unit under all drive commutations.

58. In combination, a plurality of driven units, a motor driving unit, commutatable driving connections therebetween, an electromagnetically controlled brake for each of said driven units, control means for said driving unit including means adapted to control the circuits of all of said brakes and means associated with said commutatable driving connections to establish and commutate connections between said brakes and said controlling means therefor to limit the action of such means to the respective brake or brakes of the driven unit or units actually connected to said driving unit.

59. In combination, a plurality of driven units, a plurality of driving units, drive commutating means therebetween, an electrically controlled brake for each of said driven units, a controller for each of said driving units including brake control means and means associated with said drive commutating means to always connect the brake of each of said driven units to a controller of its respective driving unit or units.

60. In combination, a driven mechanism, a plurality of motor drives therefor, variable driving connections between said motor drives and said driven mechanism, a control device for said driven mechanism electrically dependent upon one or the other of said motor drives and means associated with said variable driving connections and governed by the setting thereof to subject said control device to the influence of said drives selectively.

61. In combination, a driven unit, a plurality of driving units therefor, drive commutating means between said driven unit and said driving units, an electromagnetically controlled brake for said driven unit and means associated with said drive commutating means to electrically connect said brake to one of said driving units acting upon said driven unit under all drive commutations.

62. In combination, a plurality of driven and motor driving units, drive commutating means therebetween, an electromagnetically controlled brake associated with each of said driven units and means associated with said drive commutating means to commutatably connect the coil of each of said brakes to a motor driving unit of its respective driven unit under all drive commutations.

63. In combination, a plurality of driven and motor driving units, drive commutating means therebetween including a plurality of independently operable couplings, an electromagnetically controlled brake associated with each of said driven units and circuit controlling devices one associated with each of said couplings to effect under all drive commutations electrical connection of the coil of each brake to a motor acting upon the respective driven unit of such brake.

64. In combination, a plurality of driven mechanisms, a motor drive common thereto, variable driving connections between said motor drive and said driven mechanisms, a control device for each of said driven mechanisms electrically dependent upon said motor drive and means associated with said variable driving connections and governed by the setting thereof to connect said control devices selectively to said motor drive.

65. In combination, a multi-unit printing press, a plurality of separate motor drives therefor, drive commutating means between said drives and the units of said press for operation of said units by said drives separately or jointly, separate controllers for said drives, a control station for each of said units and means operatively associated with said drive commutating means to connect said controllers and said stations and to commutate the connections therebetween to give the station of each unit full control of the drive or drives acting upon such unit.

66. In combination, a multi-unit press, a plurality of separate motor drives therefor, each of said drives including a small motor for low speeds and a large motor for higher speeds, drive commutating means between said drives and the units of said press for operation of said units by said drives separately or jointly, separate controllers for said drives, a control station for each of said units and means operatively associated with said drive commutating means to connect said controllers and said stations and to commutate the connections therebetween to give the station of each unit full control of the drive or drives acting upon such unit.

67. In combination, a multi-unit printing press, an electrically controlled brake for each unit of said press, a plurality of separate motor drives for said press, drive commutating means between said drives and press units for connection thereof in different combinations, separate controllers for said drives each including an overload protective device, a control station and a paper break switch for each of said units and commutating switches operatively associated with said drive commutating means to establish and commutate connections between said controllers and said stations, between said paper break switches and said controllers, between the coils of said brakes and said drives and between said overload devices of said controllers.

In witness whereof, I have hereunto subscribed my name in the presence of two witnesses.

MAURICE M. GOLDENSTEIN.

Witnesses:
TEKLA BAST,
H. WATSON.

Copies of this patent may be obtained for five cents each, by addressing the "Commissioner of Patents, Washington, D. C."